(12) United States Patent
Liang et al.

(10) Patent No.: US 9,841,766 B2
(45) Date of Patent: Dec. 12, 2017

(54) RESTRAINT DEVICE, RESTRAINT SYSTEM AND RESTRAINT METHOD FOR RESTRICTING ROBOT TO CARRY OUT TASK IN PREDETERMINED AREA

(71) Applicant: Shenzhen Silver Star Intelligent Technology CO., LTD., Shenzhen (CN)

(72) Inventors: Xianhua Liang, Shenzhen (CN); Xinming Huang, Shenzhen (CN); Wanshui Wu, Shenzhen (CN); Xingwen Chen, Shenzhen (CN); Qiang Wu, Shenzhen (CN); Kuanzhe Zhang, Shenzhen (CN)

(73) Assignee: Shenzhen Silver Star Intelligent Technology CO., LTD., Shenzhen (CN)

( * ) Notice: Subject to any disclaimer, the term of this patent is extended or adjusted under 35 U.S.C. 154(b) by 151 days.

(21) Appl. No.: 15/080,600

(22) Filed: Mar. 25, 2016

(65) Prior Publication Data
US 2017/0212524 A1    Jul. 27, 2017

(30) Foreign Application Priority Data
Jan. 27, 2016   (CN) .......................... 2016 1 0052461

(51) Int. Cl.
*G01C 22/00* (2006.01)
*G05D 1/02* (2006.01)

(52) U.S. Cl.
CPC .......... *G05D 1/0276* (2013.01); *Y10S 901/01* (2013.01)

(58) Field of Classification Search
CPC ............................. G05D 1/0276; Y10S 901/01
See application file for complete search history.

(56) References Cited

U.S. PATENT DOCUMENTS

| | | | |
|---|---|---|---|
| 6,690,134 B1 | 2/2004 | Jones et al. | |
| 2013/0138246 A1* | 5/2013 | Gutmann | G05D 1/0231 700/253 |
| 2014/0180478 A1* | 6/2014 | Letsky | E01H 5/098 700/258 |

* cited by examiner

*Primary Examiner* — Adam Alharbi

(57) ABSTRACT

A restraint device of the disclosure restricts a robot to carry out a task in a predetermined area. The restraint device includes a portable housing, a first signal receiver and a first signal transmitter. The first signal receiver receives signals transmitted from the robot. The first signal transmitter is electrically connected to the first signal receiver, and is configured for communicating with the robot. The first signal receiver includes a plurality of signal receiving units positioned toward a front wall of the portable housing, and the plurality of signal receiving units receive the signals from the robot at a predetermined position and within a predetermined angle range. The first signal transmitter responses to signal received states of the plurality of signal receiving units to communicate with the robot. The disclosure also offers a restraint system and a restraint method thereof.

13 Claims, 15 Drawing Sheets

RESTRAINT DEVICE, RESTRAINT SYSTEM AND RESTRAINT METHOD FOR RESTRICTING ROBOT TO CARRY OUT TASK IN PREDETERMINED AREA

CROSS REFERENCE TO RELATED APPLICATIONS

This application is priority to the following patent properties: Chinese Patent Application CN 201610052461.2, filed on Jan. 27, 2016, the above application is hereby incorporated by reference herein as if set forth in its entirety.

BACKGROUND

1. Technical Field

The present disclosure generally relates to robots control field, and especially to a restraint device, a restraint system and a restraint method for restricting a robot to carry out a task in a predetermined area.

2. Description of Related Art

Generally, a robot moves in a working area and carries out a task at the same time, without operation of a user. For example, the robot cleaners absorb dust impurities on a floor to clean rooms for people, family robot monitors are used for home surveillance, and self-propelled moving devices carry out specific tasks.

When the robot carries out a task, the robot is required to be restricted in a specific area to carry out the task. An available restraint system for restricting a robot in the specific area employs a portable transmitter transmits a restricting signal. When the robot detects the restricting signal, the robot carries out an evasion action to go back to the specific area. However, as long as the robot is working, the portable transmitter is required to transmit the restricting signal continually, which results of a large power consumption. When the robot finishes the task, if the user forgets to turn off the portable transmitter, the power of the portable transmitter will be used up soon.

On the other hand, when the robot moves to a position of the restricting signal, if a barrier arises between the robot and the portable transmitter, and shields the restricting signal from the portable transmitter, the robot would fail to receive the restricting signal from the portable transmitter. As a result, the robot disaffiliates from the original specific area, and carries out the task in another specific area.

Therefore, a need exists in the industry to overcome the described problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
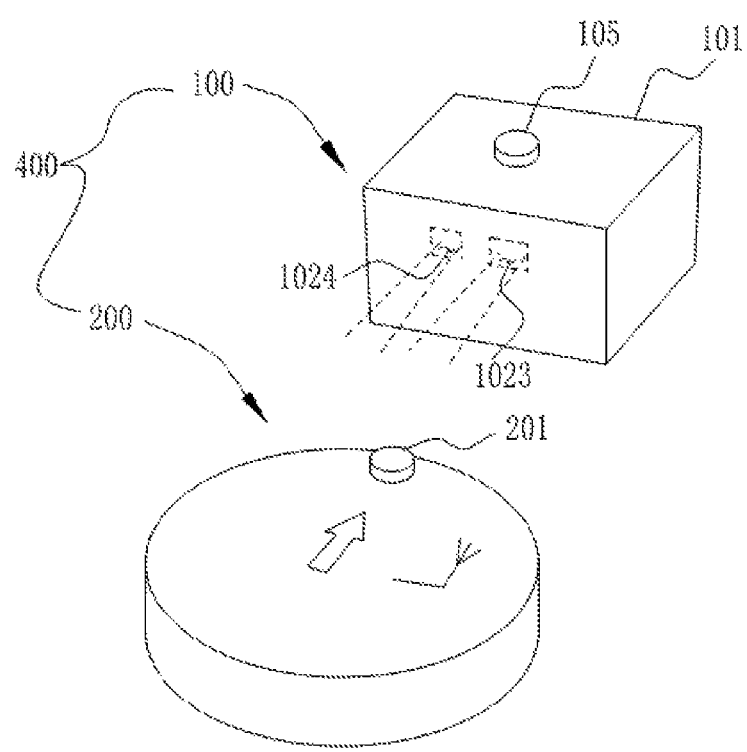
FIG. 1 is a diagrammatic drawing of a restraint system according to a first exemplary embodiment of the disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

With reference to FIG. 1, a restraint system 400 according to a first exemplary embodiment of the disclosure includes a restraint device 100 and a robot 200 wireless connected with the restraint device 100. The restraint device 100 is used for restricting the robot 200 to carry out a task within a predetermined area 300, shown in FIG. 5.

Figure 2:
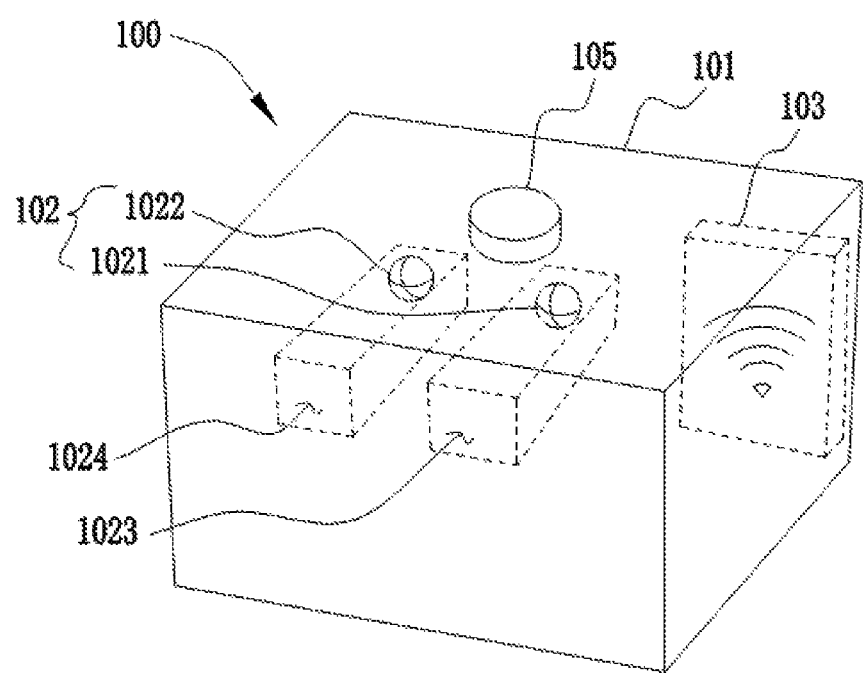
FIG. 2 is a diagrammatic drawing of a restraint device of FIG. 1.
Figure 3:
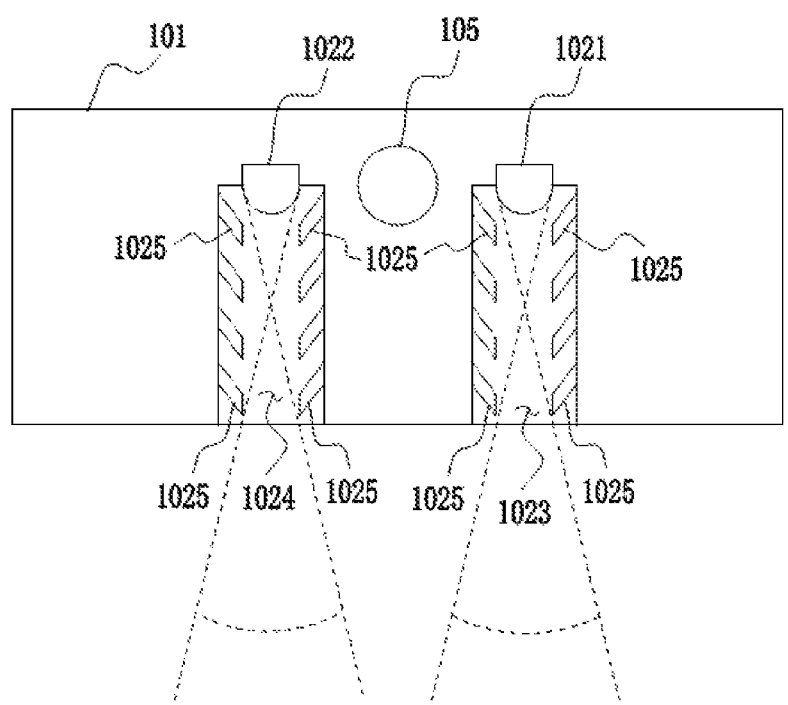
FIG. 3 is a cross section view of the restraint device of FIG. 2, wherein the restraint device receives signals within areas and angles represented by the dashed line.
Figure 4:
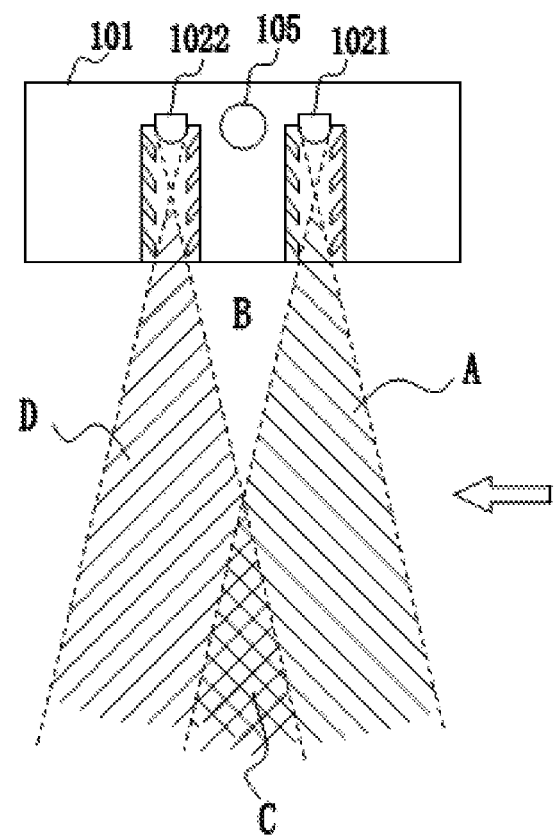
FIG. 4 is same as FIG. 3, the areas of the FIG. 3 are divided into four area, labeled as A, B, C, and D.

With reference to FIGS. 2-4, the restraint device 100 includes a portable housing 101, a first signal receiver 102 and a first signal transmitter 103. The first signal receiver 102 is installed in the portable housing 101, and is configured for receiving signals transmitted from the robot 200. The first signal transmitter 103 is installed in the portable housing 101, and is electrically connected with the first signal receiver 102. The first signal transmitter 103 is configured for communicating with the robot 200.

The first signal receiver 102 includes a plurality of signal receiving units positioned toward a front wall of the portable housing 101. When the robot 200 goes through a front of the portable housing 101, one of the signal receiving units that receives the signal from the robot 200 firstly is defined as a first signal receiving unit, one of the signal receiving units that receives the signal from the robot 200 secondly is defined as a second signal receiving unit, and so on, a Nth (N>1) signal receiving unit receives the signal from the robot 200 the Nth time. The first signal transmitter 103 responses signal received states of the plurality of signal receiving units to communicate with the robot 200.

In the embodiment, the first signal receiver 102 includes two signal receiving units, respectively named as a first signal receiving unit 1021 and a second signal receiving unit 1022. The first signal receiving unit 1021 and the second signal receiving unit 1022 are positioned toward the front wall of the portable housing 101, and receive the signals from the robot 200 within a predetermined position and a predetermined angle range.

The front wall of the portable housing 101 defines a plurality of slits corresponding to the plurality of signal receiving units. Signals at the predetermined position and within the predetermined angle range are restricted to pass through the slits to be received by the plurality of signal receiving units. In the embodiment, the front wall of the portable housing 101 defines a first slit 1023 corresponding to the first signal receiving unit 1021, and a second slit 1024 corresponding to the second signal receiving unit 1022. The first silt 1023 and the second slit 1024 are so positioned to restrict the signals fallen within the predetermined position and the predetermined angle range to go through the first and second slits 1023, 1024. Thus, the first signal receiving unit 1021 and the second signal receiving unit 1022 receive the signals that pass through the first slit 1023 and the second slit 1024, respectively.

In the embodiment, a plurality of baffle-boards 1025 are received in each of the first slit 1023 and the second slit 1024. Each of the baffle-boards 1025 tilts toward the front of the portable housing 101. The baffle-boards 1025 are so positioned to prevent the signals beyond the predetermined position and the predetermined angle range from being reflected by inner walls of the first and second slits 1023, 1024, so that the first signal receiving unit 1021 and the second signal receiving unit 1022 are incapable of receiving the signals beyond the predetermined position and the predetermined angle range. That is, the signals beyond the predetermined position and the angle range are reflected out of the portable housing 101 by the plurality of baffle-boards 1025, which ensures that the signals beyond the predetermined position and the predetermined angle range fails to be received by the first signal receiving unit 1021 and the second signal receiving unit 1022.

With reference to FIG. 3, the first signal receiving unit 1021 and the second signal receiving unit 1022 receive the signals from the robot 200 within the predetermined position and the predetermined angle range represented by the dashed line.

With reference to FIG. 4, the predetermined position are divided into four area, respectively labeled as A, B, C, D. The arrow represents a moving direction of the robot 200. It is supposed that when the robot 200 moves to the A area, the first signal receiving unit 1021 is capable of receiving the signals from the robot 200, and the second signal receiving unit 1022 is incapable of receiving the signals from the robot 200. When the robot 200 moves to the B area, both of the first signal receiving unit 1021 and the second signal receiving unit 1022 are unable to receive the signals from the robot 200. When the robot 200 moves to the C area, both of the first signal receiving unit 1021 and the second signal receiving unit 1022 are capable of receiving the signals from the robot 200. When the robot 200 moves to the area D, the second signal receiving unit 1022 is capable of receiving the signals from the robot 200, and the first signal receiving unit 1021 is capable of receiving the signals from the robot 200.

It is supposed that if only one of the first and second receiving units 1021, 1022 receives the signals from the robot 200, the first signal transmitter 103 of the restraint device 100 do not communicates with the robot 200. That is, only when the second receiving unit 1022 receives the signals from the robot 200, the first signal transmitter 103 of the restraint device 100 communicates with the robot 200.

In detail, when the robot 200 moves to the area A or the area B, the first signal transmitter 103 of the restraint device 100 does not communicate with the robot 200. Only the robot 200 are positioned at the area C or the area D, the second signal receiving unit 1022 receives the signals from the robot 200, the first signal transmitter 103 of the restraint device 100 would communicate with the robot 200.

The robot 200 includes a second signal transmitter 201 located a top of the robot 200. The second signal transmitter 201 of the robot 200 transmits omni-directional signals continually.

Figure 5:
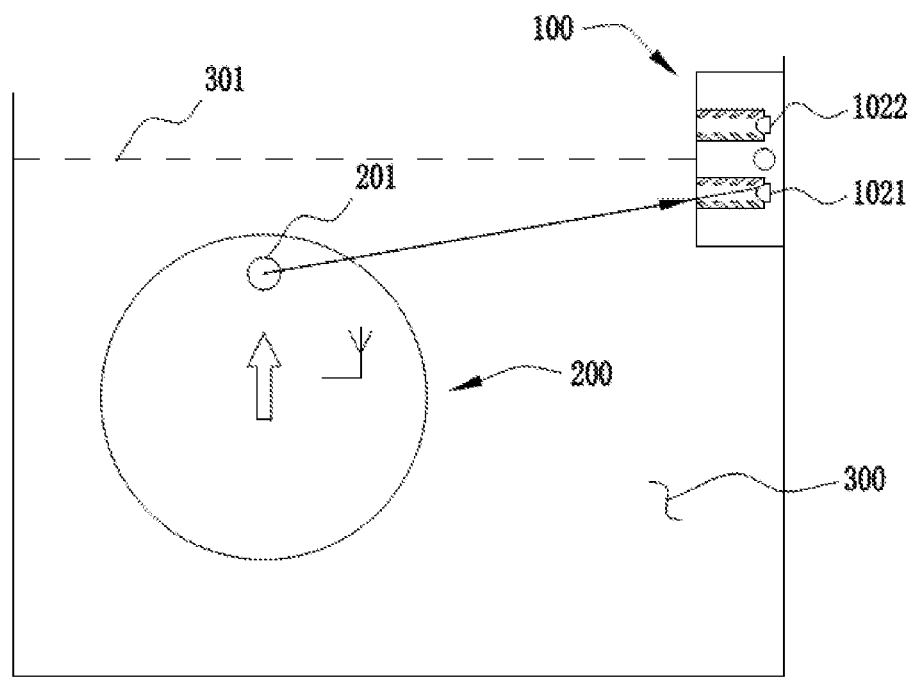
FIG. 5 is a working schematic diagram of the restraint system of FIG. 1 according to a first exemplary embodiment of the disclosure, wherein a first signal receiving unit receives signals from the robot.
Figure 6:
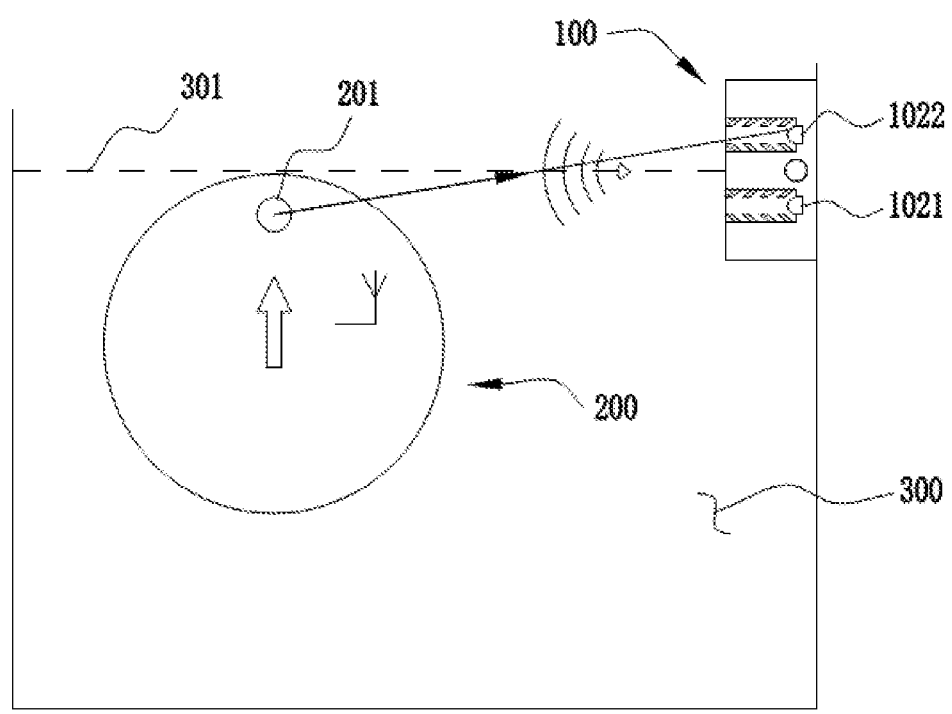
FIG. 6 is same as FIG. 5, wherein the robot moves to an open edge of a predetermined area, and the restraint device transmits a first wireless signal to the robot.

With reference to FIG. 5 and FIG. 6, in use, the restraint device 100 is positioned at an open edge 301 of the predetermined area 300, such as a door of a room. The robot 200 is positioned at the predetermined area 300 and the second signal transmitter 201 of the robot 200 transmits the onmi-directional signals continually. When the robot 200 moves at the front of the restraint device 100, the first signal receiving unit 1021 receives the signals transmitted from the robot 200 firstly. When the robot 200 moves close to the open edge 301 of the predetermined area 300, shown in FIG. 6, and the second signal receiving device 1022 receives the signal from the robot 200. As described above, when the second signal receiving device 1022 receives the signal from the robot 200, the restraint device 100 communicates with the robot 200.

In the embodiment, when the second signal receiving device 1022 receives the signal from the robot 200, the first signal transmitter 103 of the restraint device 100 transmits a first wireless signal to the robot 200 to order the robot 200 to carry out an evasive action. As a result, the robot 200 goes back to the predetermined area 300 to continue carrying out the task, and the robot 200 is restricted in the predetermined area 300 to carry out the task.

In the embodiment, the first wireless signal transmitted by the first signal transmitter 103 can be a string of data that is modulated and can be identified by the robot 200. When the robot 200 identifies the string data corresponding to a procedure set in the robot 200, the robot 200 carries out the evasive action according to the procedure.

Figure 7:
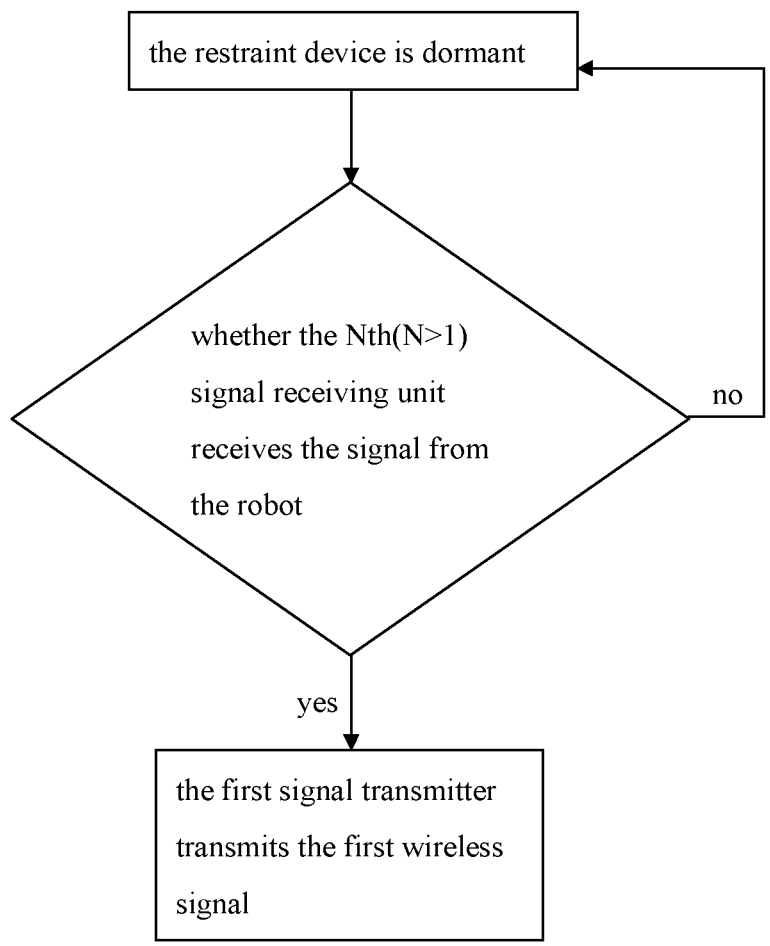
FIG. 7 is a working flow chart of the restraint device according to the first exemplary embodiment corresponding to FIG. 5 and FIG. 6.

FIG. 7 is a working flow chart of the restraint device 100 according to the first exemplary embodiment corresponding to FIG. 5 and FIG. 6. In initial, the restraint device 100 is dormant or on standby, the first and second signal receiving units 1021, 1022 of the restraint device 100 are in a status of being ready to receive signals. At this time, the restraint device 100 does not transmit any signal.

Only when the Nth (N>1) signal receiving unit receives the signals from the robot 200, the restraint device 100 transmits the first wireless signal to the robot 200. After sending the first wireless signal to the robot 200, the restraint device 100 recovers to be dormant.

That is, in the first embodiment, the restraint device 100 is dormant or standby when the restraint device 100 fails to receive signals from the robot 200, and the first signal transmitter 103 does not send any signals. Only when the second signal receiving unit 1022 of restraint device 100 receives the signals from the robot 200, the first signal transmitter 103 of the restraint device 100 transmits the first wireless signal to the robot 200. After sending the first wireless signal to the robot 200, the restraint device 100 recovers to be dormant or on standby. In other words, when the robot 200 carries out the task in the predetermined area 300, the restraint device 100 is not required to send signals continually, which results of low power consumption of the restraint device 100.

Figure 8:
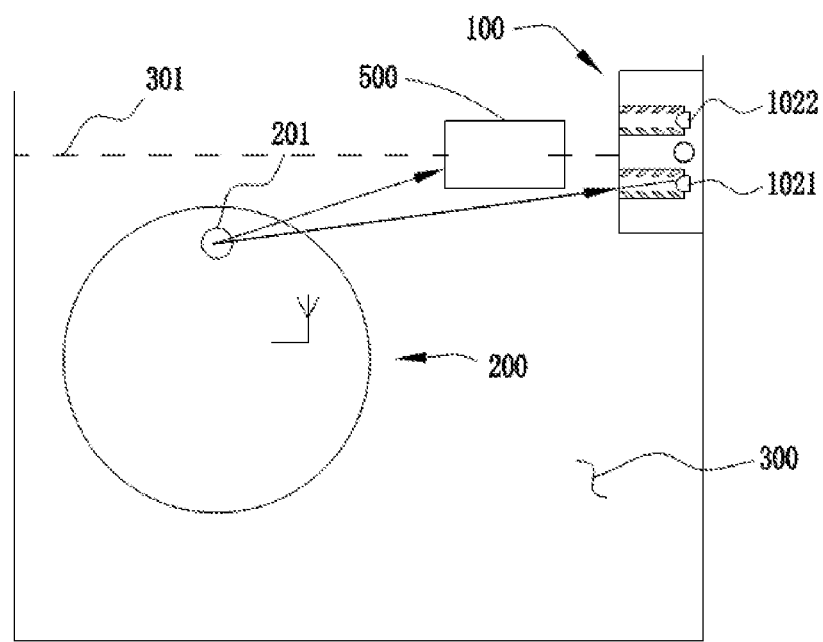
FIG. 8 is a working schematic diagram of the restraint system according to a second exemplary embodiment of the disclosure, wherein a barrier is located between the robot and the restraint device.
Figure 9:
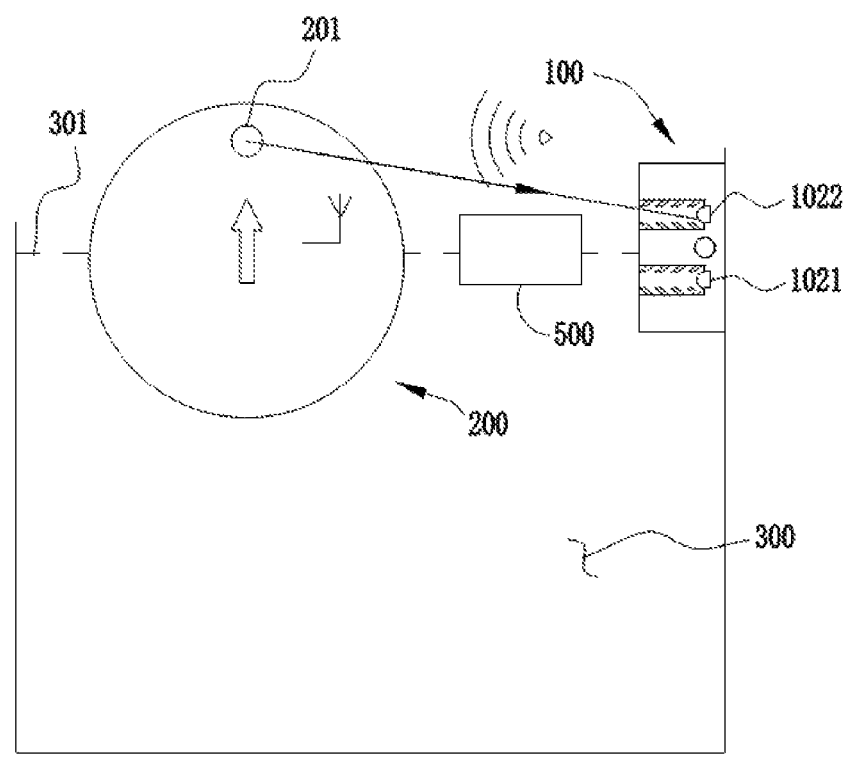
FIG. 9 is same as FIG. 8, wherein the robot moves over the open edge of the predetermined area.

With reference to FIG. 8 and FIG. 9, in the embodiment, a barrier 500 is located between the robot 200 and the restraint device 100. As a result, the predetermined position and the predetermined angle range are shrunk, the first signal receiving unit 1021 receives signals transmitted by the robot 200 at a tiny angle. When the robot 200 moves forward, both the first signal receiving unit 1021 and the second signal receiving unit 1022 are incapable of receiving the signals from the robot 200 during a period time.

The first signal receiving unit 1021 receives the signals from the robot 200 firstly, shown in FIG. 8. When the robot 200 continues to move forward and go over the open edge 301 of the predetermined area 300, the second signal receiving unit 1022 receives the signals from the robot 200 within a receiving area of the second signal receiving unit 1022. As a result, the first signal transmitter 103 of the restraint device 100 transmits the first wireless signals to the robot 200 to order the robot 200 to carry out the evasion action, and the robot 200 goes back to the predetermined area 300 to continue the task, which reduces a probability of the robot 200 out of the predetermined area, in case of an emergency.

That is, even if the robot 200 goes beyond the open edge 31 the predetermined area 300 because of the barrier between the robot 200 and the restraint device 100, as long as the second signal receiving unit 1022 can receive the signals from the robot 200, the restraint device 100 can communicate with the robot 200 to order the robot 200 to go back to the predetermined area 300, which can reduces a probability of the robot 200 out of the predetermined area 300 effectively, in case of the emergency.

Of course, if the barrier 500 is big enough to shield the slits 1023, 1024 of the portable housing 101, the restraint device 100 is incapable of receiving the signals from the robot 200, so that the restraint device 100 cannot communicate with the robot 200, and the restraint device 100 loses the original function. Therefore, if the is small and exists within a short time, such as, a person or a pet exactly pass between the robot 200 and the restraint device 100, the restraint device 100 of the disclosure reduces a probability of the robot 200 out of the predetermined area effectively.

Figure 10:
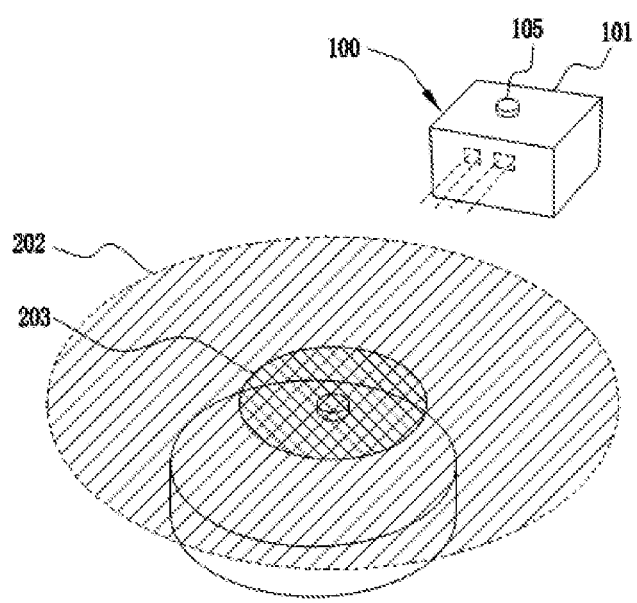
FIG. 10 is a schematic diagram of the restraint system according to a second exemplary embodiment of the disclosure.

With reference to FIG. 10, the restraint device 100 further includes a second signal receiver 105 electrically connected to the first signal receiver 103 and receiving the signals from the robot 200. The second signal transmitter 201 of the robot 200 transmits a long distance signal 202 corresponding to the first signal receiver 102 of the restraint device 100, and a short distance signal 203 corresponding to the second signal receiver 105 of the restraint device 100.

In the embodiment, a distance of signal transmission of the long distance signal 202 covers at least a length of the open edge 301 of the predetermined area 300, so that the first signal receiver 102 is capable of receiving the long distance signal 202. The distance of signal transmission of the long distance signal 202 is normally defined within a range between 3 meter to 5 meter. A distance of signal transmission of the short distance signal covers the second signal receiver 105 at least, when the robot 200 is close to the restraint device 100, so as to avoid the crash between the robot 200 and the restraint device 100. The distance of signal transmission of the short distance signal 203 is normally defined within a range between 0.3 meter to 0.5 meter. The second signal receiver 105 of the restraint device 100 is configured to receive the short distance signal from the robot 200.

In use, if the second signal receiver 105 of the restraint device 100 receives the short distance signal from the robot 200, the first signal transmitter 103 of the restraint 100 transmits a third wireless signal to the robot 200 to order the robot 200 to go away from the restraint device 100. The robot 200 may turn round to move away from the restraint device 100, or move back away from the restraint device 100, which avoids the crash between the robot 200 and the restraint device 100.

It is noted that, a type of first signal receiver 102 of the restraint device 100 corresponds to that of the second signal transmitter 201 of the robot 200. In the embodiment, the second signal transmitter 201 of the robot 200 is an infrared signal transmitting device. Correspondingly, the first signal receiver 102 of the restraint device 100 is an infrared signal receiving device also.

Alternatively, the second signal transmitter 201 of the robot 200 may be a supersonic wave transmitting device. Correspondingly, the first signal receiver 102 of the restraint device 100 is a supersonic wave receiving device also.

In the embodiment, the first signal transmitter 103 of the restraint device 100 is a wireless communication device with a frequency of 2.4 G. In order to reduce cost, the first signal transmitter 103 may be a one-way communication device. That is, the first signal transmitter 103 is capable of transmitting the wireless signal to the robot 200, and the robot 200 is incapable of transmitting wireless signal to the first signal transmitter 103.

Alternatively, the first signal transmitter 103 may be a two-way communication device to achieve complex procedure. The available wireless communication technology, such as Wi-Fi, Bluetooth can be employed on the first signal transmitter 103.

Figure 11:
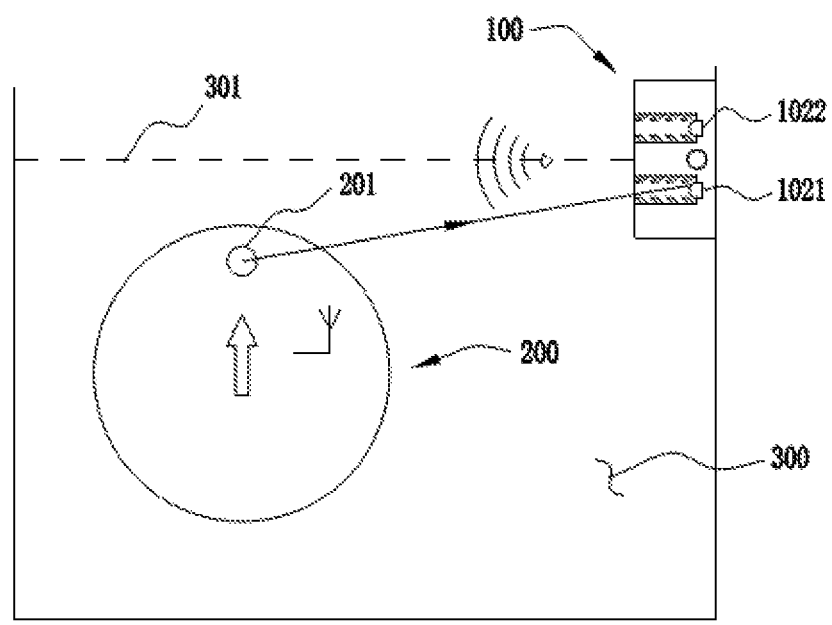
FIG. 11 is a working schematic diagram of the restraint system according to a third exemplary embodiment of the disclosure.

FIG. 11 is a working schematic diagram of the restraint system 400 according to a third exemplary embodiment of the disclosure. When the robot 200 moves to the A area shown in FIG. 4, only the first signal receiving unit 1021 receives the signals from the robot 200, the first signal receiving unit 1021 triggers the first signal transmitter 103 of the restraint device 100 to send the second wireless signal to the robot 200 to inform the robot 200 that the robot 200 will be close to the open edge 301 of the predetermined area 300. Subsequently the robot 200 moves by a speed selected from one of a constant speed, a slow down speed and a predetermined speed, so as to prevent the robot 200 from rushing out of the predetermined area 300, due to a fast speed.

Figure 12:
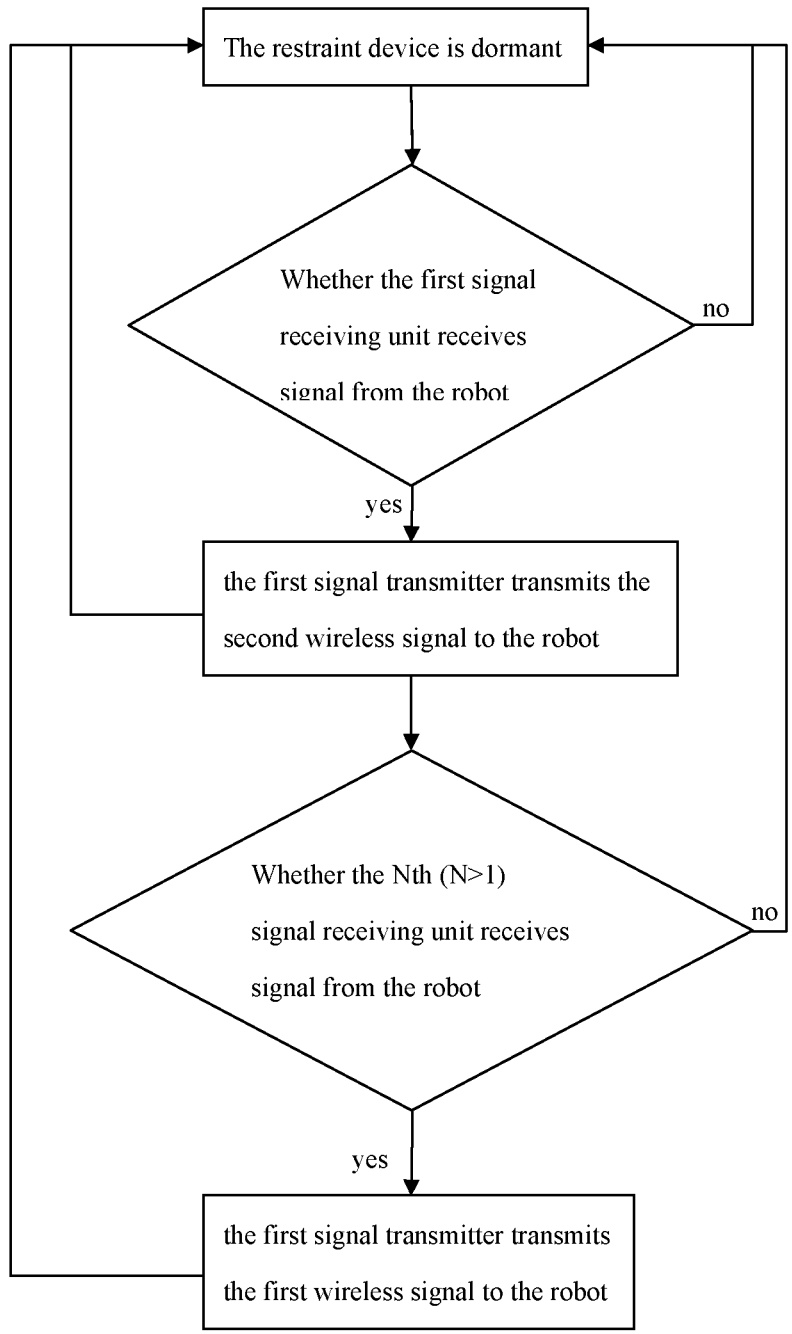
FIG. 12 is a working flow chart of the restraint device according to a second exemplary embodiment of the disclosure corresponding to FIG. 11.

FIG. 12 is a working flow chart of the restraint device 100 according to a second exemplary embodiment corresponding to FIG. 11. The restraint device 100 is dormant or is on standby initially, and the restraint device 100 is in a low power consumption. When the first signal receiving unit 1021 receives the signal from the robot 200, the first signal transmitter 103 is triggered to transmit the second wireless signal to the robot 200, subsequently, the restraint device 100 recovers to be dormant, and the robot 200 moves by a speed selected from one of the constant speed, the slow down speed and the predetermined speed. When the second signal receiving unit 1022 receives the signal from the robot 200, the second signal transmitter 103 is triggered to transmit the first wireless signal to the robot 200, subsequently, the restraint device 100 recovers to be dormant. When the robot 200 receives the first wireless signal, the robot 200 carries out the evasion action and go back to the predetermined area 30.

In some special cases, if the robot 200 rushes out the edge 301 of the predetermined area 300 due to fast speed, because before the robot 200 rushes out of the predetermined area, the second signal receiving unit 1022 has received the signals from the robot 200 and triggers the second signal transmitter 103 to transmit the first wireless signal to the robot 200, so that the robot 200 is still capable of returning to the predetermined area 300.

Figure 13:
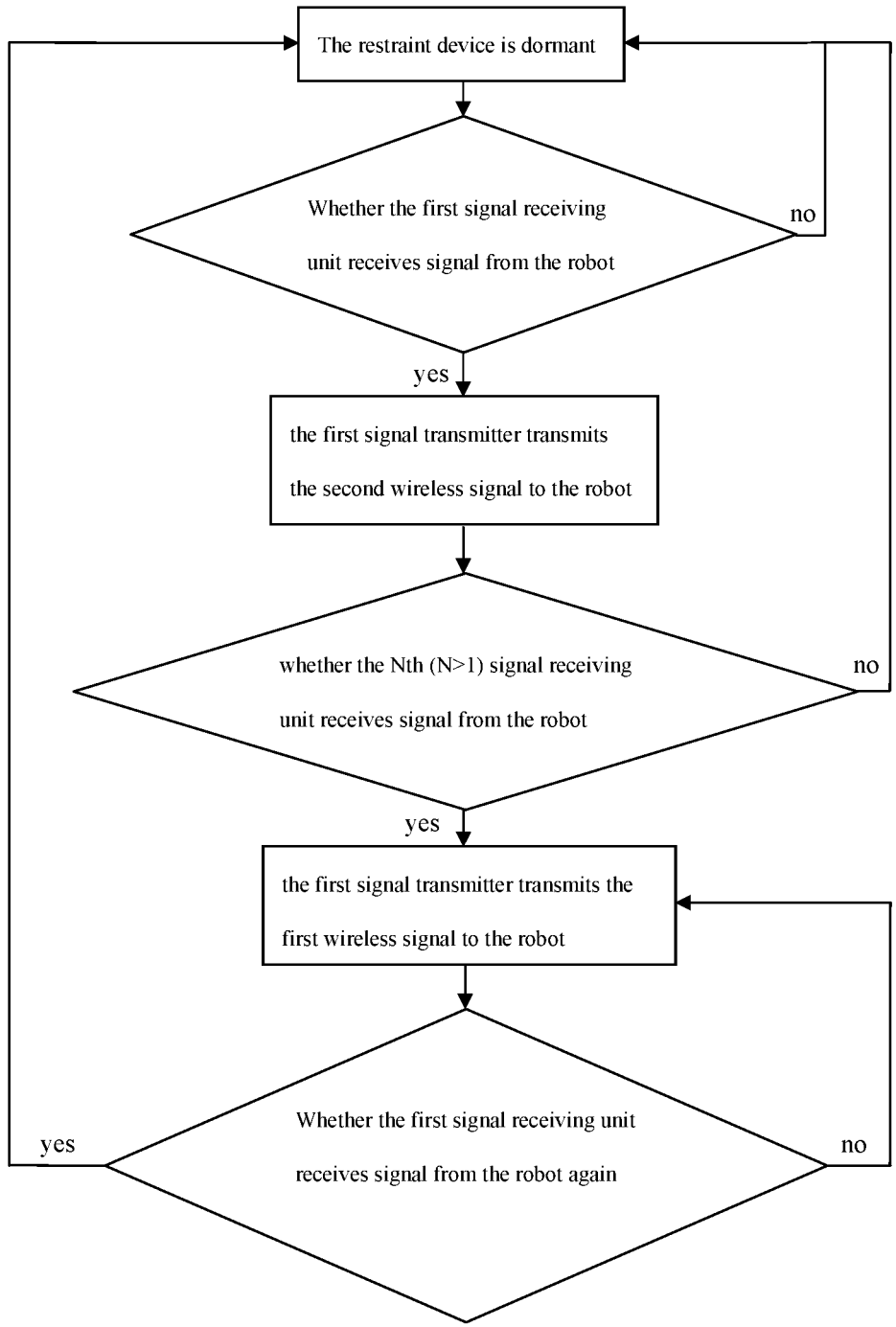
FIG. 13 is a working flow chart of the restraint device according to a third exemplary embodiment of the disclosure.

FIG. 13 is a working flow chart of the restraint device 100 according to a third exemplary embodiment of the disclosure. In the embodiment, the restraint device 100 is dormant or is on standby initially, and the restraint device 100 is in low power consumption. If the first signal receiving unit 1021 receives the signal from the robot 200, the first signal transmitter 103 is triggered to transmit the wireless signal to the robot 200. When the robot 200 receives the second wireless signal, the robot 200 moves by the speed selected from one of the constant speed, a slow down speed and a predetermined speed. When the second signal receiving unit 1022 receives the signal from the robot 200, the second signal transmitter 103 is triggered to transmit the first wireless signal to the robot 200. When the robot 200 receives the first wireless signal, the robot 200 carries out the evasion action and go back to the predetermined area 300. At this time, the restraint device 100 determines whether the first signal receiving unit 1021 receives the signals from the robot 200 again. If the first signal receiving unit 1021 receives the signals from the robot 200 again, it indicates that the robot 200 has already returned to the predetermined area 300. Subsequently, the restraint device 100 stops transmitting the second wireless signal to the robot 200, and recovers to be dormant, which lows power consumption effectively. In contrast, if the first signal receiving unit 1021 fails to receive the signals from the robot 200 again, it indicates that the robot 200 has not returned to the predetermined area 300, and the restraint device 100 transmits the first wireless signal to the robot 200 again to inform the robot 200 to carry out the evasion action and go back to the predetermined area 300.

Figure 14:
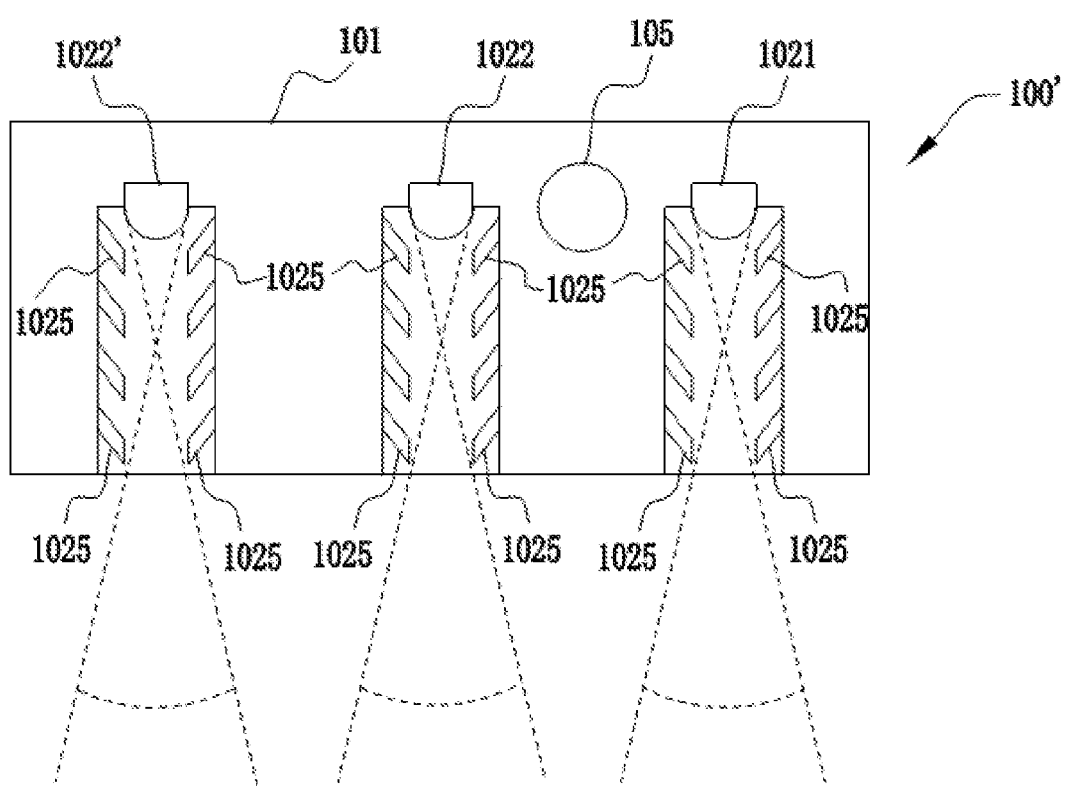
FIG. 14 is a schematic diagram of the restraint device according to a third exemplary embodiment of the disclosure.
Figure 15:
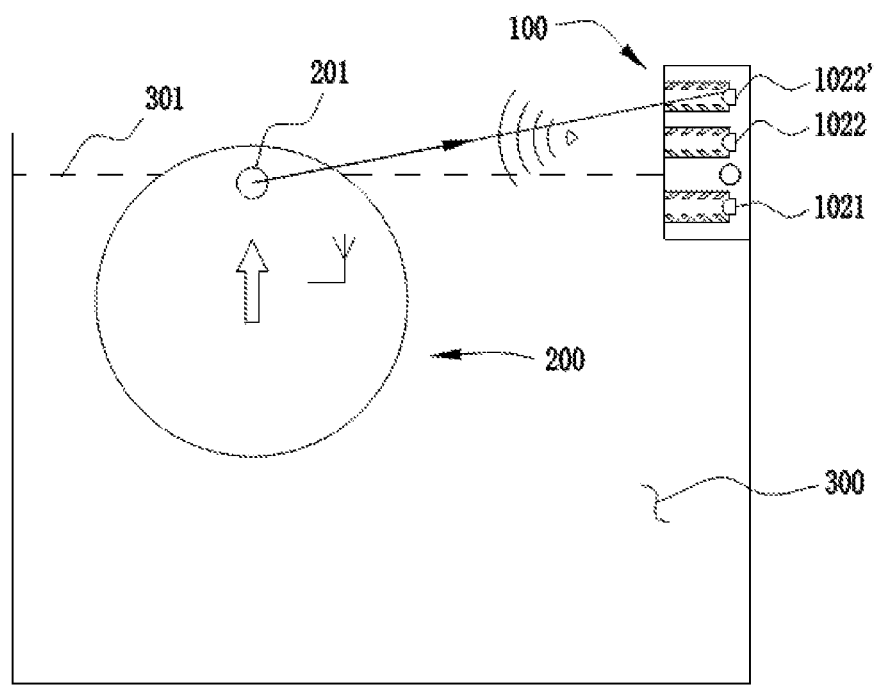
FIG. 15 is a working schematic diagram of the restraint system according to a fourth exemplary embodiment of the disclosure and corresponding to FIG. 14.

FIG. 14 is a schematic diagram of the restraint device according to a third exemplary embodiment of the disclosure. FIG. 15 is a working schematic diagram of the restraint system according to a fourth exemplary embodiment of the disclosure. The structure of the restraint device 100' is same as that of the restraint device 100, but only differs that the restraint device 100' further includes a third signal receiving unit 1022'. When the third signal receiving unit 1022' receives signals from the robot 200, and as long as one of the first signal receiving unit 1021 and the second signal receiving unit 1022 receives the signals from the robot 200, the first signal transmitter 103 of the restraint device 100 transmits the wireless signal to the robot 200, and the robot 200 carries out the evasion action and go back to the predetermined area 300.

A restraint method according to an exemplary embodiment of the disclosure is used to restrict the robot 200 to carry out the task in the predetermined area 30. The restraint device 100 is located at the open edge 301 of the predetermined area 300, such as the door of the room. A plurality of signal receiving units of the restraint device 100 are parallel with the open edge 301 of the predetermined area 300.

The restraint method includes following steps.

The restraint device 100 is dormant or on standby, the robot 200 carries out the task in the predetermined area 300, and the second signal transmitter 201 of the robot 200 transmits signals continually;

When the robot 200 goes close to the open edge 301 of the predetermined area 300, the first signal receiving unit 1021 of the restraint device 100 close to one side of the robot receives the signals from the robot firstly;

When a Nth signal receiving unit has received the signals from the robot 200, the first signal transmitter 103 of the restraint device 100 transmits the first wireless signal to the robot 200 to order the robot 200 to carry out the evasive action. The number N is greater than number 1.

The restraint device 100 recovers to be dormant. The robot 200 goes back to the predetermined area 300 to continue the task according to the evasive action.

Alternatively, the restraint method further includes the following step. After the first signal receiving unit 1021 receives the signals from the robot 200, the first signal transmitter 103 of the restraint device 100 transmits the second wireless signal to the robot 200 to inform the robot 200 to go forward with one speed selected from the constant speed, the slow down speed, and the predetermined speed.

Alternatively, the restraint method further includes the following step. When the second signal receiver 105 at the top of the restraint device 100 receives the short distance signal transmitted by the second signal transmitter 201 of the robot 200, the first signal transmitter 103 of the restraint device 100 transmits the third wireless signal to order the robot 200 to go away from the restraint device 100.

Alternatively, the restraint method further includes the following step. When the robot 200 receives the signal of the evasive action, if the robot 200 finishes the task for the predetermined area 300, the robot 200 is not going to response to the signals of the evasive action, and carries out another task according to a predetermined procedure set in the robot 200.

Alternatively, the restraint method further includes the following step. When the robot receives the signal of evasive action, if the robot finishes the task for the predetermined area, the robot sends a fourth wireless signal to the restraint device to order the restraint device to recover to an original state. Under the circumstances described above, the two-way wireless communication device can be set between the robot 200 and the restraint device 100, so that the robot 200 can send the wireless signal to the restraint device 100 to enable the restraint device 100 to be dormant again.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A restraint device for restricting a robot to carry out a task in a predetermined area, the restraint device comprising a portable housing, a first signal receiver and a first signal transmitter, wherein the first signal receiver is located in the portable housing and is configured for receiving signals transmitted from the robot, and the first signal transmitter is located in the portable housing and is electrically connected to the first signal receiver, the first signal transmitter is configured for communicating with the robot, and wherein the first signal receiver comprises a plurality of signal receiving units positioned toward a front wall of the portable housing, and the plurality of signal receiving units receive the signals from the robot at a predetermined position and within a predetermined angle range; and wherein the first signal transmitter responses to signal received states of the plurality of signal receiving units to communicate with the robot.

2. The restraint device of claim 1, wherein the portable housing defines a plurality of slits at the front wall of the portable housing corresponding to the plurality of signal receiving units, and first signals at the predetermined position and within the predetermined angle range are restricted to pass through the slits to be received by the plurality of signal receiving units.

3. The restraint device of claim 2, wherein a plurality of baffle-boards are located in each of the slits and tilt toward the front of the portable housing, second signals beyond the predetermined position and the predetermined angle range are reflected out of the portable housing by the plurality of baffle-boards, and the second signals fail to be received by the plurality of signal receiving units.

4. The restraint device of claim 1, further comprising a second signal receiver located at a top of the portable housing, and is electrically connected with the first signal transmitter, and wherein the second signal receiver is configured for receiving a short distance signal transmitted by the robot.

5. The restraint device of claim 1, wherein each signal receiving unit selects from one of a light wave signal receiver and a supersonic signal receiver, and the first signal transmitter is a wireless communication device.

6. A restraint system comprising a restraint device and a robot, the restraint device restricting the robot to carry out a task in a predetermined area, wherein
the restraint device comprises a portable housing, a first signal receiver and a first signal transmitter, wherein the first signal receiver is located in the portable housing and is configured for receiving signals transmitted from the robot, and the first signal transmitter is located in the portable housing and is electrically connected to the first signal receiver, the first signal transmitter is configured for communicating with the robot, and wherein the first signal receiver comprises a plurality of signal receiving units positioned toward a front wall of the portable housing, and the plurality of signal receiving units receive the signals from the robot at a predetermined position and within a predetermined angle range; and wherein the first signal transmitter responses to signal received states of the plurality of signal receiving units to communicate with the robot, and wherein
the robot comprises a second signal transmitter corresponding to the plurality of signal receiving units of the restraint device,
wherein if a first signal receiving unit of the first signal receiver receives the signals from the robot firstly, as long as a Nth signal receiving unit receives the signals from the robot, the first signal transmitter of the restraint device transmits a first wireless signal to the robot to enable the robot to carry out an evasive action to return to the predetermined area to continue the task, and wherein the number N is greater than the number 1.

7. The restraint system of claim 6, wherein after the first signal receiving unit receives the signals from the robot, the first signal transmitter of the restraint device transmits a second wireless signal to the robot to inform the robot that the robot is close to an open edge of the predetermined area, and the robot moves forward with one speed selected from a constant speed, a slow down speed, and a predetermined speed.

8. The restraint system of claim 6, wherein the restraint device comprises a second signal receiver located at a top of the portable housing, and electrically connected with the first signal transmitter, the second signal transmitter of the robot transmits a long distance signal corresponding to the signal receiving units of the restraint device, and a short distance signal corresponding to the second signal receiver of the restraint device, and when the second signal receiver receives the short distance signal form the robot, the first signal transmitter of the restraint device transmits a third wireless signal to the robot to order the robot to go away the restraint device.

9. A restraint method for restricting a robot to carry out a task in a predetermined area, wherein a restraint device is located at an open edge of the predetermined area, and a plurality of signal receiving units of the restraint device are parallel with the open edge of the predetermined area; and wherein the restraint method comprises the following steps:
the restraint device is dormant or on standby, a second signal transmitter of the robot transmits signals continually;
when the robot goes close to the open edge of the predetermined area, a first signal receiving unit of the restraint device receives the signals from the robot firstly;
when a Nth signal receiving unit has received the signals from the robot, a first signal transmitter of the restraint device transmits a first wireless signal to the robot to order the robot to carry out an evasive action, wherein the number N is greater than 1;
the restraint device recovers to be dormant or on standby, and the robot goes back to the predetermined area to continue the task according to the evasive action.

10. The restraint method of claim 9, further comprising after the first signal receiving unit receives the signals from the robot, the first signal transmitter of the restraint device transmits a second wireless signal to the robot to inform the robot to go forward with one speed selected from a constant speed, a slow down speed, and a predetermined speed.

11. The restraint method of claim 9, further comprising when a second signal receiver at the top of the restraint device receives a short distance signal transmitted by the second signal transmitter of the robot, the first signal transmitter of the restraint device transmits a third wireless signal to order the robot to go away from the restraint device.

12. The restraint method of claim 9, further comprising when the robot receives the signals of the evasive action, if the robot finishes the task for the predetermined area, the robot is not going to response to the signals of the evasive action, and carries out another task according to a predetermined procedure set in the robot.

13. The restraint method of claim 9, further comprising when the robot receives the signal of evasive action, if the robot finishes the task for the predetermined area, the robot sends a fourth wireless signal to the restraint device to order the restraint device to recover to an original state.

* * * * *